(12) United States Patent
Honchen et al.

(10) Patent No.: US 8,900,452 B2
(45) Date of Patent: Dec. 2, 2014

(54) SELF-CENTERING FILTERS, COALESCERS AND SEPARATORS

(76) Inventors: Richard E. Honchen, Shortsville, NY (US); John Zuniga, Penfield, NY (US)

( * ) Notice: Subject to any disclaimer, the term of this patent is extended or adjusted under 35 U.S.C. 154(b) by 571 days.

(21) Appl. No.: 12/462,842

(22) Filed: Aug. 10, 2009

(65) Prior Publication Data

US 2010/0116350 A1 May 13, 2010

Related U.S. Application Data

(60) Provisional application No. 61/188,336, filed on Aug. 8, 2008.

(51) Int. Cl.
| | |
|---|---|
| *B01D 29/00* | (2006.01) |
| *B01D 46/00* | (2006.01) |
| *B23P 11/00* | (2006.01) |
| *B01D 46/24* | (2006.01) |

(52) U.S. Cl.
CPC ........ *B01D 29/006* (2013.01); *B01D 2265/026* (2013.01); *B01D 46/2411* (2013.01); *B01D 46/0005* (2013.01); *B01D 2201/4046* (2013.01)
USPC ..................... 210/232; 210/323.2; 210/497.01

(58) Field of Classification Search
CPC ........ B01D 29/52; B01D 29/26; B01D 33/37; B01D 46/2411; B01D 2265/026
USPC ................. 210/322–323.2, 340, 346, 497.01; 137/15.01, 315.01
See application file for complete search history.

(56) References Cited

U.S. PATENT DOCUMENTS

| | | | | |
|---|---|---|---|---|
| 4,209,310 A | * | 6/1980 | Berkhoel | 96/426 |
| 6,372,133 B1 | * | 4/2002 | von der Hardt et al. | 210/232 |

* cited by examiner

*Primary Examiner* — John Kim
(74) *Attorney, Agent, or Firm* — Steven R. Scott

(57) ABSTRACT

This self-centering device for cylindrical elements such as filters, coalescers and separators having a central axis and adapted for placement with an open end over and in communication with an aperture with a rod extending from its center incorporates or includes a notched member having an open side adapted for lateral capture of the rod along with a holding structure for holding the notched member in position proximate the central axis. The holding structure includes a connector for connection of the self-centering element to the cylindrical element, and a dividing member adapted to divide the open end of the cylindrical element into portions in communication with the open side and portions not in communication with the open side. The connector can advantageously take the form of a member attached to the cylindrical element proximate the open end, a member attached to a rim of the cylindrical element proximate said open end, and/or a member forming a portion of the rim attached to the cylindrical element proximate said open end.

20 Claims, 8 Drawing Sheets

SELF-CENTERING FILTERS, COALESCERS AND SEPARATORS

RELATED APPLICATIONS

This application claims an invention that was disclosed in U.S. Provisional Application No. 61/188,336, filed 8 Aug. 2008, entitled "Self-Centering Bracket for Filters, Coalescers and Separators". The benefit under 35 USC §119(e) and/or other applicable law of the aforesaid United States provisional application is hereby claimed, and the aforementioned application is hereby incorporated herein by reference.

BACKGROUND AND SUMMARY

This invention pertains generally to systems, apparatus and methods to aid in the installation of large cylindrical members/elements such as filters, separators, or coalescers that are installed in a horizontal orientation against a vertical seal plate. The invention introduces an alignment member positioned at the insertion end of the cylindrical element so as to bisect or split the insertion end into separate portions and hold in position a center notch for use in interfacing with a horizontal fastening rod, and an associated methodology for installation that can greatly simplify the installation and centering of such cylindrical filters, separators, or coalescers.

Large cylindrical filters, separators, or coalescers (hereinafter also referred to as cylindrical processing members, cylindrical elements or cylindrical members) serve in numerous capacities to filter, separate and/or coalesce substances in fluid or gaseous state. Such processing members must often be installed into housings in a horizontal position with one of their cylindrical ends abutting and sealed to and over an aperture in a vertical seal plate. Quite often, due to cost, and space constraints, the service access provided prevents the installer from being able to reach into the housing a sufficient distance to aid in installation/replacement. The filters, separators, or coalescers that extend beyond the reach of the installer become very difficult to hold in place, and even more difficult to properly align to and on the housing sealing plate over the aperture (which is, typically, the furthest distance from the operator).

These problems can best be understood by reference to FIGS. 1A and 1B. FIG. 1A provides a schematic illustration of a prior art cylindrical member 1 installed in a typical location abutting a vertical seal plate 2 in a tank 10 so as to cover an aperture 2A passing through seal plate 2. FIG. 1B provides a more detailed view of cylindrical member 1; illustrating the multiple layers (e.g., designated layers 1A, 1B) comprising the body of cylindrical member 1, as well as its o-ring 1C, rim cap 1D, and o-ring groove 1E in rim cap 1D. As will be noted from the aforesaid drawing figures, the access cover 3 provided in tank 10 is small and makes insertion of the cylindrical member 1 over a centering rod 4 difficult as well as making centering of open end 5A in proper sealing position against plate 2 over aperture 2A extremely awkward. These difficulties are exacerbated when said cylindrical member 1, as is usual, has a closed end 5B opposite open end 5A. There is an axially aligned mounting hole 5C for rod 4 in closed end 5B, but the fact that this end is closed makes it virtually impossible to accurately align the other end (open end 5A) of cylindrical member 1 for proper sealing in the closed space and circumstances outlined and described.

In general terms, the instant invention resolves and avoids these difficulties using novel attachment and centering apparatus and methodologies, resulting in numerous advantages, all of which are based on the incorporation or inclusion of a centering element in the cylindrical member/element 1. The centering element includes a notched member having an open side adapted for lateral capture of the rod along with a holding structure for holding the notched member in position proximate the central axis of cylindrical member 1. The holding structure includes a connector for connection of the self-centering element to the cylindrical element 1, and a dividing member adapted to divide the open end 5A of the cylindrical element 1 into portions in communication with the open side of the notch (into which the rod 4 is inserted) and portions not in communication with the open side of the notch. The aforesaid connector can advantageously take the form of a member attached to the cylindrical element proximate said open end, a member attached to a rim of the cylindrical element proximate said open end, and/or a member forming a portion of the rim attached to the cylindrical element proximate said open end.

DESCRIPTION

Figure 1A:
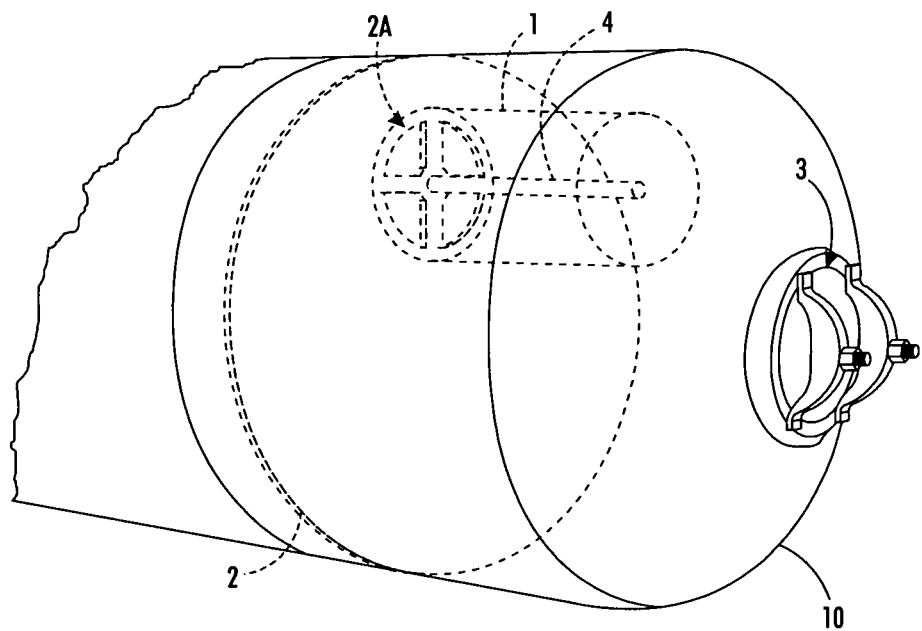
FIG. 1A provides a perspective view of a tank with a cylindrical member installed therein in accordance with the teachings of prior art, with elements within the tank indicated in a schematic manner.
Figure 1B:
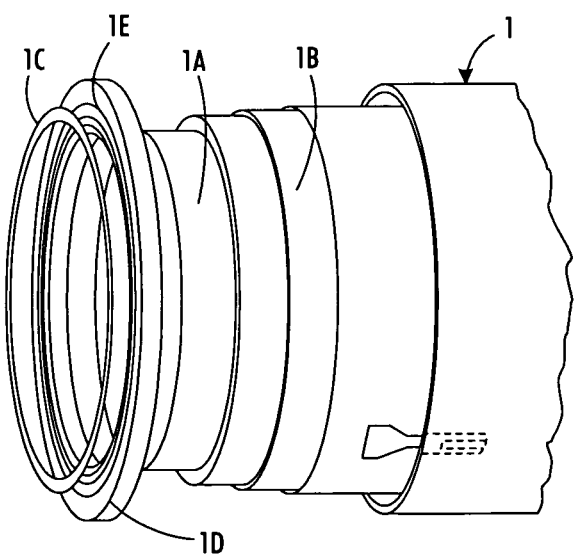
FIG. 1B provides a perspective slightly exploded view of the open end of a cylindrical member in accordance with the teachings of prior art.

In general, the instant invention resolves and avoids the difficulties inherent in prior art by providing and supporting a notched member in the form of a centering notch 6A, 60A in the open insertion end 5A of the cylindrical member 1 that is to be installed against vertical plate 2 so as to be in communication with aperture 2A. In its basic embodiments, as illustrated in FIGS. 2 through 6, the holding structure of the centering device 6 takes the form of a bisecting brace or bracket with a center notch 6A installed in or forming part of the open insertion end 5A of the cylindrical member 1. As will be clear from review of the drawing figures, the bisecting linear portion of centering device 6 forms a dividing member which divides the open end 5A of cylindrical member 1 into portions in communication 5A' with open side 6A' of center notch 6A (as well as portions not in communication with open side 6A'). In its preferred embodiment, as illustrated in FIGS. 7A through 9C, the portion of the centering device 60 under (and not in communication with) the center notch 60A is substantially closed with slots 60C or other openings for fluid flow. The substantial closure of this half in the preferred embodiments prevents the operator from installing the coalescer on the wrong side of centering rod 4. This addition does not impede the fluid flow, nor limit the access to install.

The invention with its center notch 6A, 60A with an open side 6A', 60A' is shaped such that when the cylindrical member 1 is partially installed over centering rod 4 with centering rod 4 in the portion in communication 5A' with open side 6A', 60A', the cylindrical member 1 can be rotated 180 degrees, causing the center notch 6A, 60A to engage and interface with the housing centering rod 4, automatically centering the cylindrical member 1 by raising up the far end (i.e., open end 5A) of the filter, separator, or coalescer (i.e., the cylindrical member 1) to align properly with the aperture 2A in the housing sealing plate 2.

Figure 2:
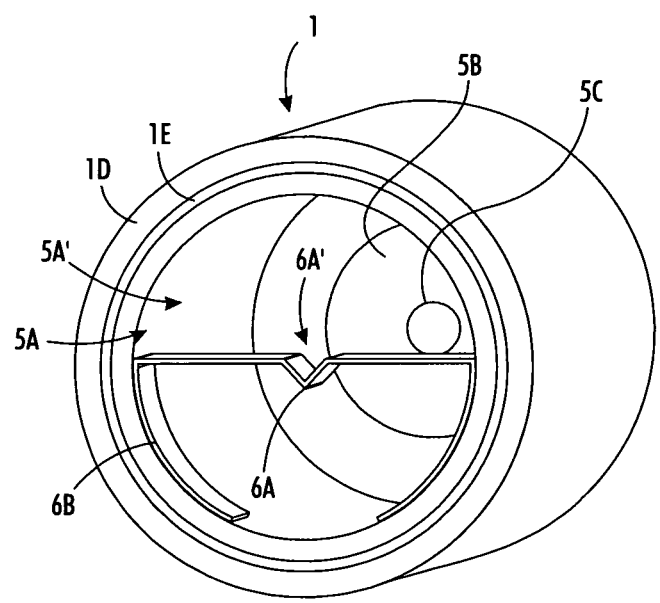
FIG. 2 provides a perspective view of a basic embodiment of the invention, illustrating a cylindrical member with bisecting centering brace or bracket in its open end in accordance with the teachings of the invention. The cylindrical member is oriented with the centering bracket in its initial insertion position.
Figure 3A:
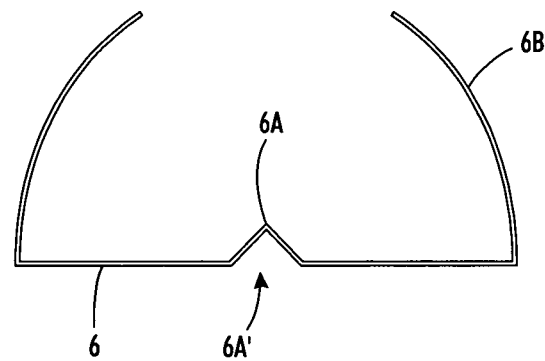
FIG. 3A provides a frontal view of the centering device of the basic embodiment, showing more exactly the features of the bisecting centering bracket of the invention.
Figure 3B:
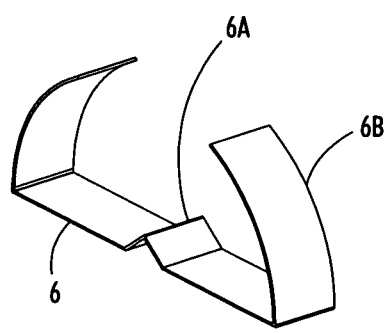
FIG. 3B provides a perspective view of the centering device of the basic embodiment, showing more exactly the features of the bisecting centering bracket of the invention.
Figure 3C:
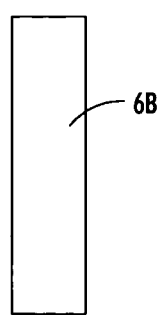
FIG. 3C provides a side view of the centering device of the basic embodiment, showing more exactly the features of the bisecting centering bracket of the invention.

As illustrated in FIG. 2, the apparatus of the invention in its basic embodiment can be simply and easily constructed by adding a dividing member (bisecting centering device/bracket 6) to open end 5A of cylindrical member 1 in the manner illustrated and previously described so as to form part of the holding structure for notch 6A. And, as will be noted in particular with reference to FIGS. 3A through 3B, appropriately shaped curved arms 6B matching the inner curvature and dimensions of cylindrical member 1 can preferably be included at either end of centering bracket 6 to aid in its incorporation into cylindrical member 1, to stabilize it in position, and for use in fastening it thereto (by welding, bolting or other means).

Figure 4:
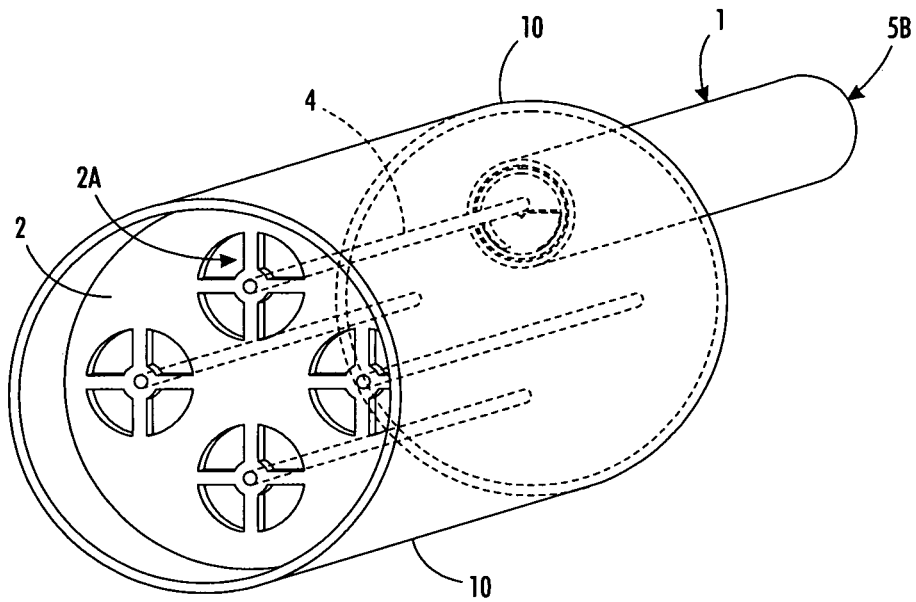
FIG. 4 provides a somewhat schematic perspective view illustrating a cylindrical member with bisecting centering bracket in its open end being inserted over a centering rod in accordance with the teachings of the invention. The cylindrical member is oriented with the centering bracket in its initial insertion position.
Figure 5:
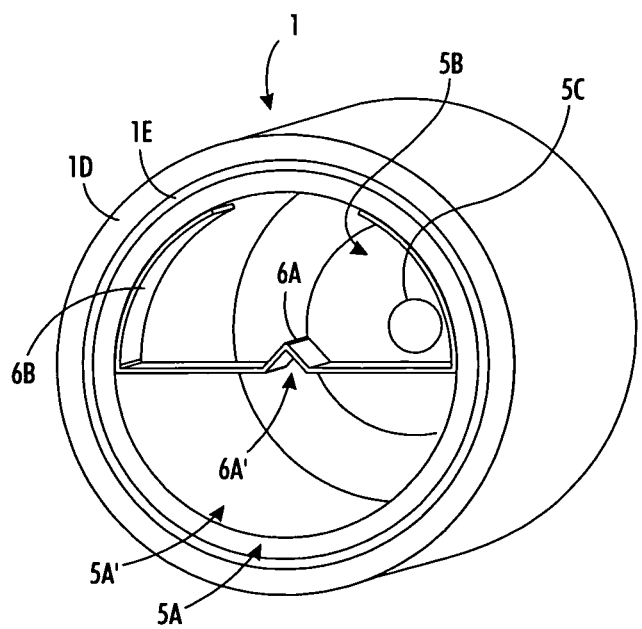
FIG. 5 provides a perspective view illustrating a cylindrical member with bisecting centering bracket in its open end in accordance with the teachings of the invention. The cylindrical member is oriented with the centering bracket in its rotated position.
Figure 6:
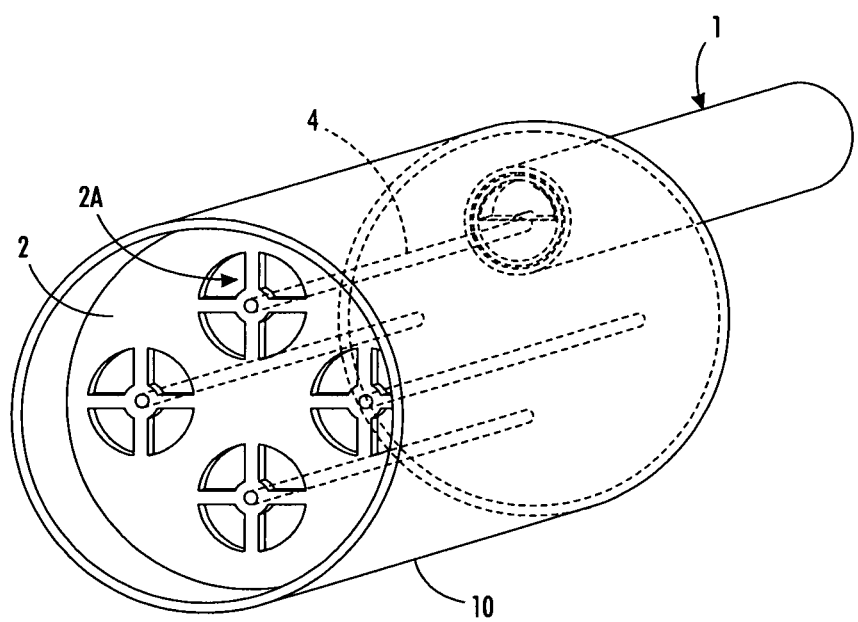
FIG. 6 provides a somewhat schematic perspective view illustrating a cylindrical member with bisecting centering bracket in its open end being inserted over a centering rod in accordance with the teachings of the invention. The cylindrical member is oriented with the centering bracket in its rotated position.
Figure 7A:
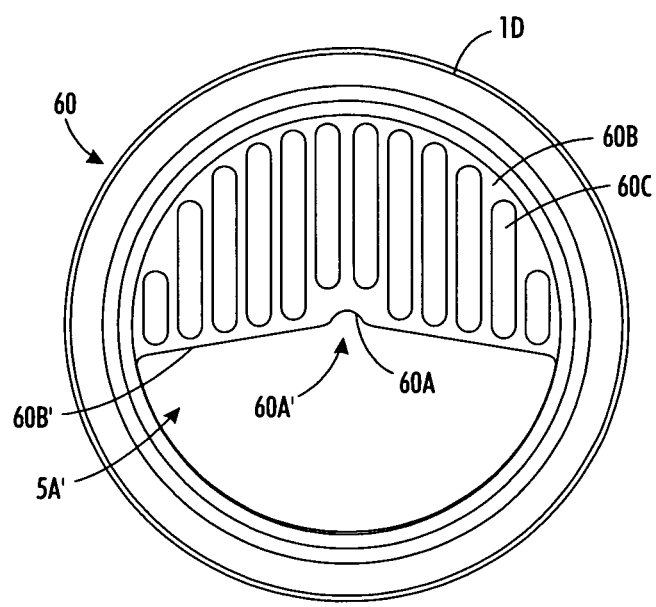
FIG. 7A provides a frontal view illustrating the preferred embodiment of the invention.
Figure 7B:
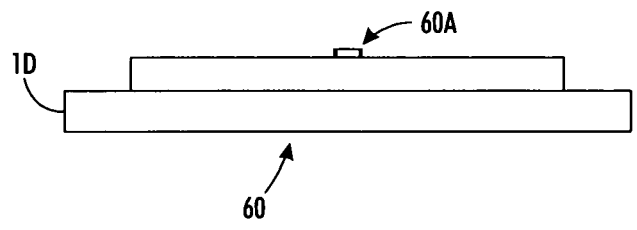
FIG. 7B provides a side view illustrating the preferred embodiment of the invention.
Figure 7C:
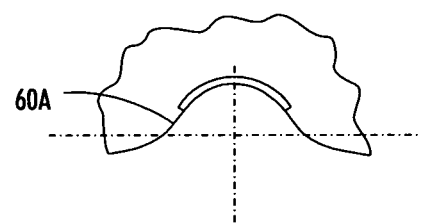
FIG. 7C provides a detailed view of the area encompassed by arrows "G" of FIG. 7A.
Figure 7D:
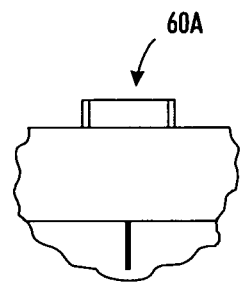
FIG. 7D provides a detailed view of the area encompassed by arrows "F" of FIG. 7A FIG. 8 provides a cross-sectional detail view taken through E-E of FIG. 7A.
Figure 8:
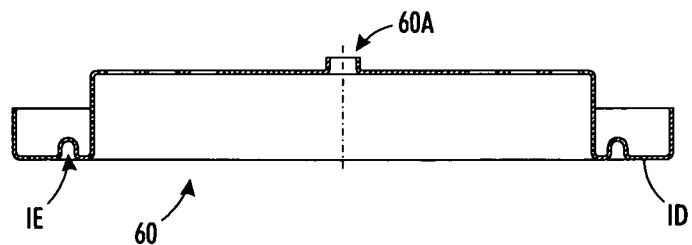
Figure 9A:
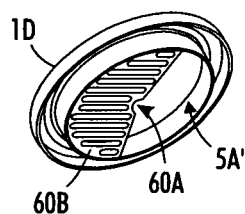
FIGS. 9A, 9B and 9C provide schematic perspective views of the preferred embodiment of the invention.
Figure 9B:
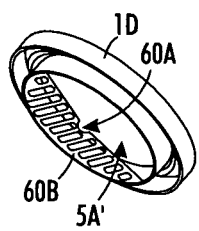
Figure 9C:
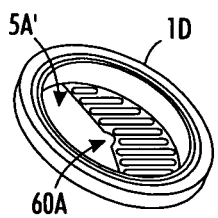

The initial insertion position is indicated in FIGS. 2 and 4, where it can be seen that the entire upper half of the open end 5A (i.e., the portions in communication 5A' with open side 6A') can be easily inserted over centering rod 4. However, at some point during the insertion process, the cylindrical member 1 is rotated around centering rod 4, bringing bisecting centering bracket 6 to its rotated (centering) position in end 5A of cylindrical member 1. (See, FIGS. 5 and 6). And, as previously stated, the act of rotation will elevate open end 5A to a position more properly aligned over aperture 2A in vertical plate 2 as centering bracket 6 is rotated to a position over centering rod 4. From this position, if centering rod 4 does not slide automatically into notch 6A, slight lateral adjustments can be used to nest centering rod 4 in the open side 6A' of central notch 6A to more perfectly center and align open end 5A for sealing contact over aperture 2A in vertical plate 2.

In its preferred embodiment, the centering device 60 is advantageously formed as part of rim 1D and the portion of device 60 under its center notch 60A is formed as a closed portion 60B with a plurality of slots 60C or other openings too small to allow insertion of rod 4 therethrough, but providing sufficient openings to allow free flow of gases and fluids. Closed portion 60B prevents the operator from installing the cylindrical member with center notch 60A on the wrong side of the centering rod 4. In the preferred embodiment of the invention, the dividing member formed by edge 60B' is tilted towards the open side 60A' of notch 60A, so as to assist in sliding/ramping rod 4 and notch 60A into engagement. In addition, notch 60A is formed with a semi-circular portion matching the peripheral dimensions of rod 4 so as to better engage rod 4.

The parts of the various embodiments described and discussed above, and enumerated in the drawing figures, are as follows:

1—Cylindrical element or member
1A—Cylindrical element/member layer
1B—Cylindrical element/member layer
1C—O-ring
1D—Rim cap
1E—O-ring groove
2—Vertical seal plate
2A—Aperture
3—Access cover
4—Centering rod
5A—Open end
5A'—Portion in communication with open side
5B—Closed end
5C—Mounting Hole for Rod
6—Centering device
6A—Centering notch
6A'—Open side
6B—Curved arms
10—Tank
60—Centering device (preferred embodiment)
60A—Centering notch (preferred embodiment)
60A'—Open side (preferred embodiment)
60B—Closed portion (preferred embodiment)
60B'—Edge
60C—Slots However, although the described advantages and features of the invention are advantageously provided through and using the embodiments previously illustrated and discussed, numerous variations are possible without deviating from and/or exceeding the spirit and scope of the invention. Moreover, various presently unforeseen or unanticipated alternatives, modifications, variations or improvements therein may be subsequently made by those skilled in the art which are also intended to be encompassed by the claims filed.

We claim:

1. An apparatus having a self-centering element, comprising:
 a housing including an interior wall;
 an aperture in said wall, said aperture having a rod extending from its center;
 a cylindrical element forming at least one of a filter, coalescer and separator, and having a self-centering element;
 wherein said cylindrical element has a central axis and is adapted for placement with an open end over and in communication with the aperture; and wherein said self-centering element comprises:
a notched member having an open side adapted for lateral capture of said rod,
a holding structure for holding said notched member in position proximate said central axis, said holding structure including a connector for connection of said self-centering element to the cylindrical element, and
wherein said holding structure includes a dividing member adapted to divide the open end of said cylindrical element into portions in communication with the open side and portions not in communication with said open side.

2. The apparatus of claim 1, wherein said connector is formed from one of
a member attached to the cylindrical element proximate said open end,
a member attached to a rim of the cylindrical element proximate said open end, and
a member forming a portion of the rim attached to the cylindrical element proximate said open end.

3. The apparatus of claim 1, wherein said dividing member is formed by a substantially linear element spanning the open end of the cylindrical element and having said notched member formed therein.

4. The apparatus of claim 1, wherein said dividing member is formed as a portion of the rim on the open end of the cylindrical element and has said notched member formed therein.

5. The apparatus of claim 1, wherein the portions not in communication with said open side are adapted to block insertion of said rod, but not flow of liquids or gases therethrough.

6. A method for providing and using a filter, coalescer or separator having a self-centering element, comprising:
providing a cylindrical element forming at least one of a filter, coalescer and separator, having a central axis and adapted for placement with an open end over and in communication with an aperture;
providing a self-centering element comprising
a notched member having an open side adapted for lateral capture of a rod,
a holding structure for holding said notched member in position proximate said central axis, said holding structure including a connector for connection of said self-centering element to the cylindrical element, and
wherein said holding structure includes a dividing member adapted to divide the open end of said cylindrical element into portions in communication with the open side and portions not in communication with said open side;
operationally positioning said self-centering element in the open end of said cylindrical element;
inserting said cylindrical element into a housing including an interior wall having an aperture with a rod extending from its center;
inserting the portion of said open end in communication with the open side of the notched member member over said rod; and
rotating said cylindrical element around its central axis and capturing said rod in the open side of said notched member.

7. The method of claim 6, wherein said connector is formed from one of
a member attached to the cylindrical element proximate said open end,
a member attached to a rim of the cylindrical element proximate said open end, and
a member forming a portion of the rim attached to the cylindrical element proximate said open end.

8. The method of claim 6, wherein said dividing member is formed by a substantially linear element spanning the open end of the cylindrical element and having said notched member formed therein.

9. The method of claim 6, wherein said dividing member is formed as a portion of the rim on the open end of the cylindrical element and has said notched member formed therein.

10. The method of claim 6, wherein the portions not in communication with said open side are adapted to block insertion of said rod, but not flow of liquids or gases therethrough.

11. Apparatus having a filter, coalescer or separator adapted for placement with an open end over and in communication with an aperture, which aperture has a rod extending from its center for use in connection of said filter, coalescer or separator in position over said aperture, said apparatus comprising:
a housing including a wall with an aperture in said wall, said aperture having a rod extending from its center for use in connection of a cylindrical element in position over said aperture;
a cylindrical element forming at least one of a filter, coalescer and separator, and having a central axis and an open end;
a self-centering element having a notched member, said notched member having an open side adapted for lateral capture of said rod;
a holding structure for holding said notched member in position proximate said central axis, said holding structure including a connector for connection of said self-centering element to the cylindrical element; and
wherein said holding structure includes a dividing member adapted to divide the open end of said cylindrical element into portions in communication with the open side and portions not in communication with said open side.

12. The apparatus of claim 11, wherein said connector is formed from one of
a member attached to the cylindrical element proximate said open end,
a member attached to a rim of the cylindrical element proximate said open end, and
a member forming a portion of the rim attached to the cylindrical element proximate said open end.

13. The apparatus of claim 11, wherein said dividing member is formed by a substantially linear element spanning the open end of the cylindrical element and having said notched member formed therein.

14. The apparatus of claim 11, wherein said dividing member is formed as a portion of the rim on the open end of the cylindrical element and has said notched member formed therein.

15. The apparatus of claim 11, wherein the portions not in communication with said open side are adapted to block insertion of said rod, but not flow of liquids or gases therethrough.

16. The apparatus of claim 2, wherein said dividing member is formed by a substantially linear element spanning the open end of the cylindrical element and having said notched member formed therein.

17. The apparatus of claim 2, wherein said dividing member is formed as a portion of the rim on the open end of the cylindrical element and has said notched member formed therein.

18. The apparatus of claim 17, wherein the portions not in communication with said open side are adapted to block insertion of said rod, but not flow of liquids or gases therethrough.

19. The apparatus of claim 1, wherein the dividing member is sloped in order to ramp said rod towards the open side of the notch when said open side faces downward.

20. The apparatus of claim 18, wherein the dividing member is sloped in order to ramp said rod towards the open side of the notch when said open side faces downward.

* * * * *